Dec. 24, 1957  C. WHITE  2,817,556
PIPE CLAMP
Filed Jan. 31, 1955
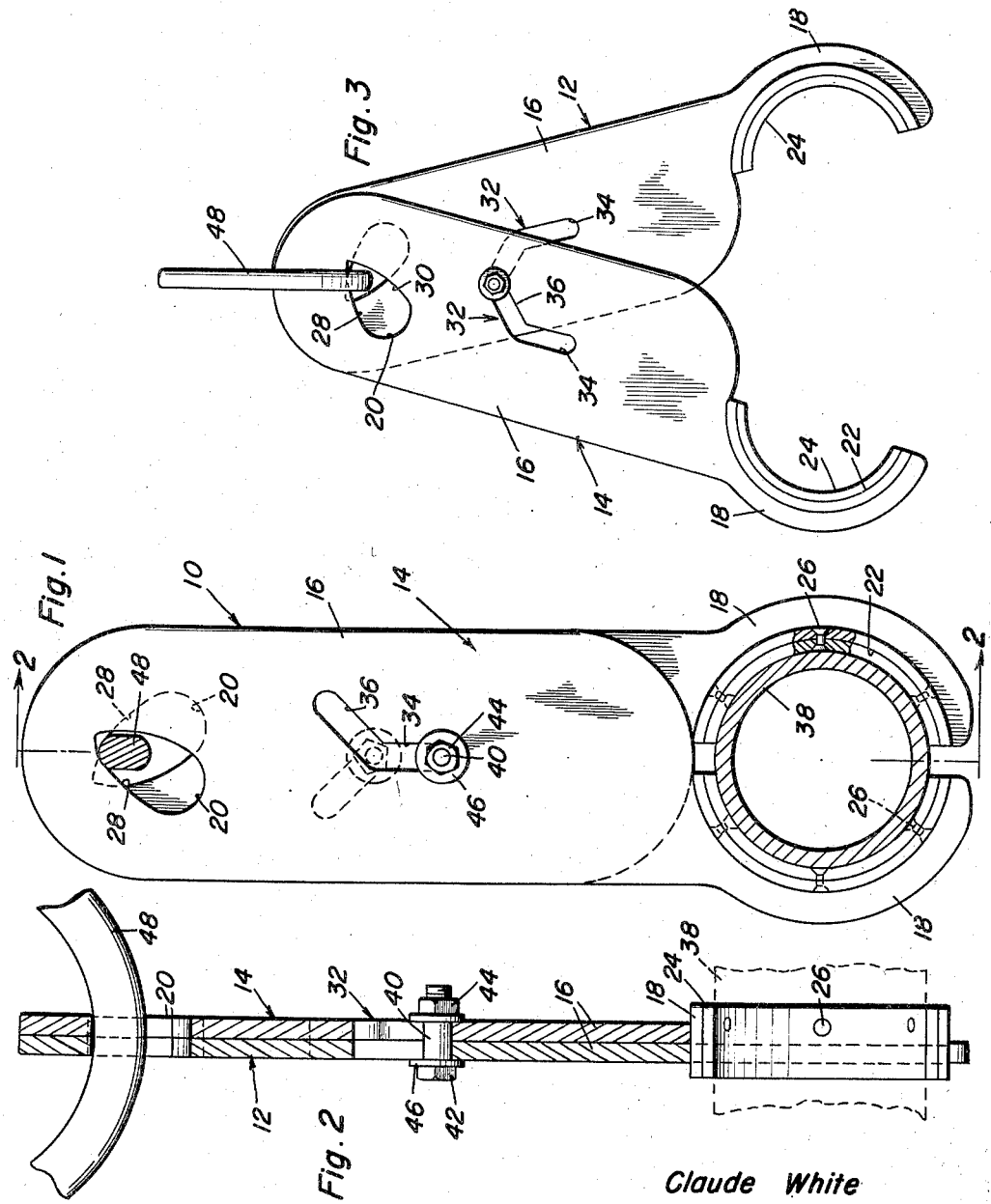
Claude White
INVENTOR.

United States Patent Office 2,817,556
Patented Dec. 24, 1957

2,817,556

PIPE CLAMP

Claude White, Baton Rouge, La.

Application January 31, 1955, Serial No. 485,095

3 Claims. (Cl. 294—116)

This invention generally relates to a pipe clamp and more specifically provides improved and novel construction in a clamp especially adapted to grip a pipe, rod or any other cylindrical object.

An object of this invention is to provide a pipe clamp constructed of two identical members having generally semi-cylindrical recesses at one end together with a slidable pivot bolt at the center and apertures with cam surfaces for receiving a lifting member whereby the pipe gripping members will more effectively grip the pipe due to the force exerted by a lifting member or by the force exerted by a suspended member when the pipe clamp is used from an overhead position.

Another object of the present invention is to provide a pipe clamp including a pair of identical members having a pair of oppositely disposed angulated slots receiving a bolt therethrough whereby the members are pivotally and slidably connected together for lateral body movement or pivotal movement.

A still further object of the present invention is to provide a pipe clamp having semi-cylindrical recesses for gripping the pipe together with a lining of friction material attached to the inner surface of the recesses for gripping the pipe for preventing slippage thereof.

Yet another important object of the present invention is to provide a pipe clamp in conformance with the preceding objects which is simple in construction, easy and efficient to operate, adapted for lifting pipes, supporting objects from pipes or the like, extremely inexpensive in manufacture and safe in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the pipe clamp of the present invention;

Figure 2 is a longitudinal, vertical sectional view taken substantially upon a plane passing along section line 2—2 of Figure 1 showing the construction of the overlying plate or strap members; and Figure 3 is a side elevational view showing the identical members forming the pipe clamp of the present invention in open position.

Referring now specifically to the drawings, it will be seen that the numeral 10 generally designates the pipe clamp of the present invention which includes a pair of identical members generally designated by the numerals 12 and 14 which for purposes of clarity will be labelled with the same numerals and only a single of the members 12 or 14 will be specifically described.

The member 14 includes an elongated plate or strap member 16 that is formed with a semi-cylindrical member 18 at one end thereof and an opening 20 at the other end thereof. The plane of the semi-cylindrical member 18 is generally at right angles to the plane of the flat plate or strap 16. The semi-cylindrical member 18 generally forms a semi-cylindrical recess 22 having a lining of soft friction inducing material 24 that is held thereon by a plurality of rivets 26 or similar fastening means. The aperture 20 in the other end of the member 16 is provided with an upper and lower inclined surface generally designated by the numerals 28 and 30 which are inclined in relation to the vertical and in relation to each other thereby forming oppositely extending cam surfaces.

At the center of the plate or strap member 16 is provided an angulated slot generally designated by the numeral 32 and including a normally vertical slot 34 and an upwardly inclined slot 36 in communication therewith thereby forming a continuous angulated slot 32. The angulated portion 36 of the slot 32 extends toward the concave side of the semi-cylindrical member 18 and the inclined surface 28 of the aperture 20 also extends upwardly and outwardly in the same direction as the angulated portion 36 of the slot 32.

As previously stated, the members 12 and 14 are positioned in overlying position for clamping a pipe 38 between the inwardly facing recesses 22 formed by the semi-cylindrical members 18. A pivot bolt 40 is positioned in the aligned vertical portions 34 of the slots 32 and the pivot bolt 40 includes a headed portion 42 and a screw threaded nut 44 thereon together with suitable washers 46 thereby pivotally retaining the members 12 and 14 in connected relation. A continuous annular ring member 48 is positioned in the aligned portion of the apertures 20 for engagement with a suitable support or a lifting member. It also will be understood that the pivot bolt 40 is slidably received within the slots 32 for body movement thereof.

In operation, the pipe clamp 10 of the present invention may be utilized for picking up pipe, rod or other cylindrical objects, for supporting objects from the overhead pipe or cylindrical object, for forming scaffolding and other temporary structural elements wherein a firm and positive clamp is necessary but yet it is necessary that such clamp be easily and quickly detached from the object to which it is clamped. In the position of the invention as illustrated in Figure 1, the members 14 and 12 are in overlying relation and a pipe 38 is clamped between the recesses 22. Upon exertion of longitudinal force on the ring 48, it will be seen that the ring 48 engages the upwardly inclined surfaces 28 of the apertures 20 which are inclined in opposite direction whereby the upper end of the member 14 will be urged in one direction and the upper end of the member 12 will be urged in the other direction about the pivot bolt 40 thereby urging the semi-cylindrical members 18 at the other end of the members 12 and 14 toward each other thereby securely and positively gripping the pipe 38 as long as any force is exerted on the ring members 48. When it is desired to loosen the members 12 and 14 and detach the clamp 10 from the pipe 38, it is only necessary to raise the pivot bolt 40 in the aligned vertical portions 34 of the slots 32 until the bolt 40 is disposed at the entrance of each of the angulated portions 36 of the slots 32 wherein the members 14 and 12 may be moved bodily in relation to each other so that the pivot bolt 40 will assume a position at the remote or closed ends of the angulated portions 36 of the slots 32 thereby permitting the members 12 and 14 to assume a position as illustrated in Figure 2. In the form of the invention as illustrated, the pipe clamp is primarily for lifting pipe wherein the bolt 40 will be retained in position by the force of gravity although the nut 44 may be tightened if desired or if utilized in a semi permanent construction. It will be understood that the relationship of the slots 32 may be inverted in instances where the pipe 38 will be positioned in an overhead relation and utilized for suspending a weight therefrom. The fact that both members 12 and 14 are constructed of identical shape and provided with identical slots 32 and openings 20 permits the devices to be constructed in a very efficient manner of well known materials thereby enhancing the economic feasibility of the pipe clamp and also reducing the number of pipe clamps necessary for performing a desired function.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A pipe clamp comprising a pair of normally overlying plates, arcuate recesses in facing edges of each of said plates at one end for receiving a pipe, means pivotally and slidably interconnecting the plates to each other adjacent the center thereof, each of said plates having an aperture in the other end thereof, and a means positioned through said apertures for connecting the plates to an object, each of said plates being generally elongated flat straps having one end disposed at right angles and formed in substantially semi-cylindrical shape thereby forming said recesses, said apertures having oppositely inclined upper surfaces whereby the connecting means positioned through the apertures will urge the ends of said plates having the apertures therein outwardly when a pulling force is exerted on said connecting means thereby urging the recessed ends of said plates inwardly about said pivot bolt thereby gripping a pipe received in said recesses.

2. A pipe clamp comprising a pair of normally overlying plates, arcuate recesses in facing edges of each of said plates at one end for receiving a pipe, means pivotally and slidably interconnecting the plates to each other adjacent the center thereof, each of said plates having an aperture in the other end thereof, and a means positioned through said apertures for connecting the plates to an object, each of said plates being generally elongated flat straps, said interconnecting means including an angulated slot in each plate and a slidable pivot bolt extending through said slots, said slots having an angulated portion extending in opposite directions thereby permitting relative sliding movement between said plates when the pivot bolt is moved into alignment with the angulated portion of said slots, said apertures having oppositely inclined upper surfaces whereby the connecting means positioned through the apertures will urge the ends of said plates having the apertures therein outwardly when a pulling force is exerted on said connecting means thereby urging the recessed ends of said plates inwardly about said pivot bolt thereby gripping a pipe received in said recess.

3. A pipe clamp comprising a pair of normally overlying plates, arcuate recesses in facing edges of each of said plates at one end for receiving a pipe, means pivotally and slidably interconnecting the plates to each other adjacent the center thereof, each of said plates having an aperture in the other end thereof, and a means positioned through said apertures for connecting the plates to an object, each of said plates being generally elongated flat straps having one end disposed at right angles and formed in substantially semi-cylindrical shape thereby forming said recesses, said interconnecting means including an angulated slot in each plate and a slidable pivot bolt extending through said slots, said slots having an angulated portion extending in opposite directions thereby permitting relative sliding movement between said plates when the pivot bolt is moved into alignment with the angulated portion of said slots, said apertures having oppositely inclined upper surfaces whereby the connecting means positioned through the apertures will urge the ends of said plates having the apertures therein outwardly when a pulling force is exerted on said connecting means thereby urging the recessed ends of said plates inwardly about said pivot bolt thereby gripping a pipe received in said recess, said recess forming pipe clamping jaws and having a lining of friction material on the inner surface.

References Cited in the file of this patent

UNITED STATES PATENTS

| 496,649 | Harness | May 2, 1893 |
| 577,783 | Powell | Feb. 23, 1897 |
| 1,033,531 | Brown | July 23, 1912 |